United States Patent [19]

Eiler

[11] 4,401,269
[45] Aug. 30, 1983

[54] LOBE MIXER FOR GAS TURBINE ENGINE

[75] Inventor: Donald C. Eiler, South Windsor, Conn.

[73] Assignee: United Technologies Corporation, Hartford, Conn.

[21] Appl. No.: 191,184

[22] Filed: Sep. 26, 1980

[51] Int. Cl.³ ............................................. F02K 1/26
[52] U.S. Cl. ................................ 239/265.17; 60/262; 60/271; 181/220
[58] Field of Search ..................... 239/265.17; 60/262, 60/271; 181/220

[56] References Cited

U.S. PATENT DOCUMENTS 4,066,214  1/1978  Johnson .......................... 60/271 X
4,149,375  4/1979  Wynosky et al. .......... 239/265.17 X Primary Examiner—Andres Kashnikow
Attorney, Agent, or Firm—Norman Friedland

[57] ABSTRACT

The lobe mixer of a gas turbine engine is modified by judiciously extending chutes axially and radially inwardly toward the engine centerline permitting the use of a smaller cooperating centerbody while improving on engine performance and noise suppression.

3 Claims, 2 Drawing Figures

LOBE MIXER FOR GAS TURBINE ENGINE

Description

1. Technical Field

This invention relates to gas turbine engines and particularly lobe mixers therefore.

2. Background Art

This invention constitutes in an improvement of the lobe mixer disclosed and claimed in U.S. Pat. No. 4,179,375 granted to T. A. Wynosky, R. A. Streib and C. A. Campbell on Apr. 17, 1979 and assigned to the same assignee as this patent application. The lobed mixer described in the above-mentioned patent scalloped adjacent side walls to effectuate premature mixing in comparison to the well known lobed mixer. While this proved efficacious in certain aircraft installations, I have found that I can improve on not only the engine performance and acoustics but also this innovation results in a reduction in weight, cost and complexity.

In accordance with this invention, the inside diameter "chutes" or valleys are extended radially inward toward the engine centerline and axially downstream from the inner lobes. This enables the conventional large bulbous or cylindrical centerbody to be replaced by a smaller conical centerbody. As a result, the centerbody of the heretofore known lobe mixers forces the core engine gases radially outward to meet with the fan gases that were being guided radially inwardly by the "chutes" of the inner diameter lobes where both gases at the discharge end intersperse to accomplish mixing.

By extending the chutes in this manner and reducing the diameter and length of the centerbody, penetration of the fan air into the core gas is accomplished. Additionally, elimination of the larger centerbody increases the total flow area at the discharge end of this mixer. Owing to this fact, flow area velocities are decreased with a consequential reduction in skin friction resulting in an improvement in performance. The residence time of the gases in the tailpipe are also increased enhancing the mixing and hence, improving performance and acoustics over and above the heretofore known mixers.

DISCLOSURE OF INVENTION

An object of this invention is to provide for a gas turbine engine an improved lobed mixer.

A feature of the invention is to extend radially and inwardly judiciously selected chutes of the lobe to penetrate the fan air into the core gases. The size of the centerbody is reduced resulting in a mixer that is characterized as being less complicated, less expensive and lighter than heretofore known mixers for the same engine characteristics, resulting in an improvement in performance and acoustics.

Other features and advantages will be apparent from the specification and claims and from the accompanying drawings which illustrate an embodiment of the invention.

BEST MODE FOR CARRYING OUT THE INVENTION

Figure 1:
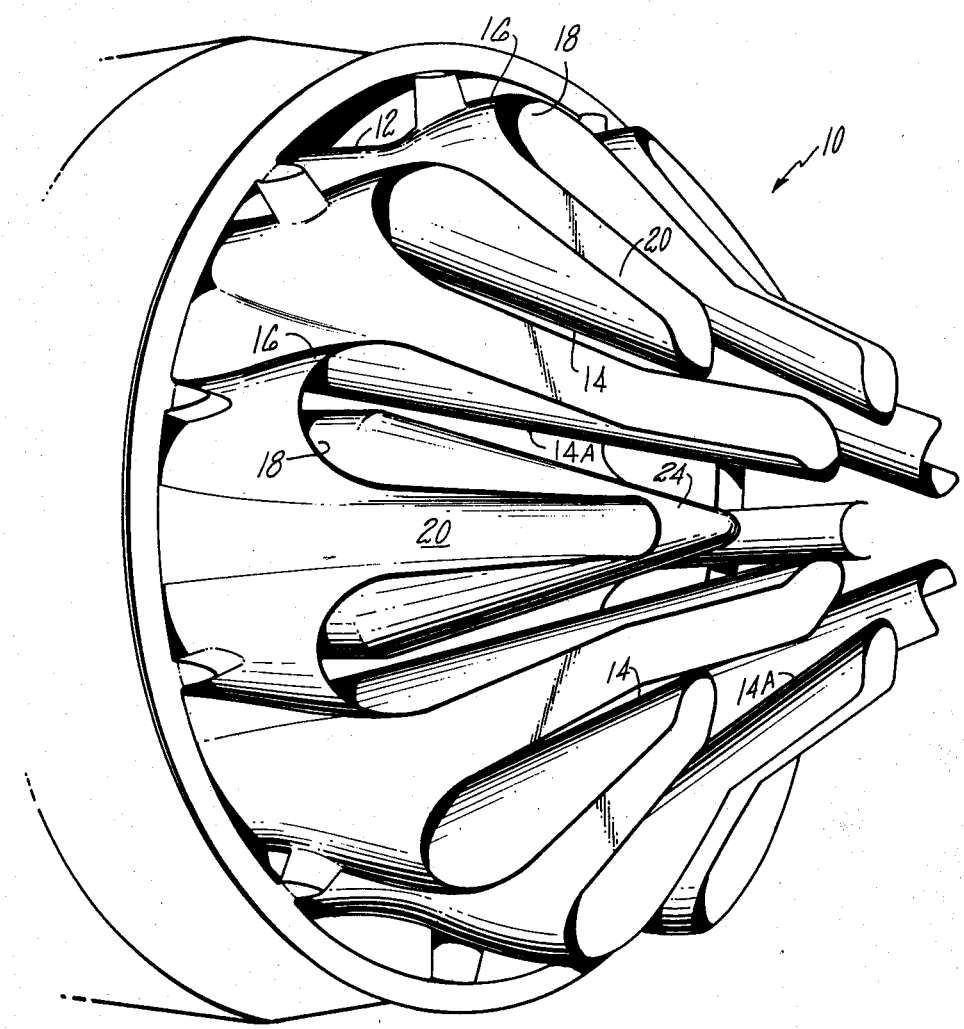
FIG. 1 is a perspective view of the invention.

Lobe mixers are described in U.S. Pat. No. 4,149,375, supra and the description thereof is incorporated herein by reference. This invention has found utility in the JT-8D engine manufactured by Pratt & Whitney Aircraft Group, division of United Technologies Corporation (the assignee). The mixer serves to direct the fan air discharging from the fan of the fan jet engine with the core gases discharging from the turbine. Until the fan air is interspersed with the core gases both are in the form of coannular streams. As noted in FIGS. 1 and 2, the mixer generally illustrated by reference numeral 10 is a cylindrical member 12 having a sinusoidal portion on the downstream end defining inner and outer lobes 14 and 16 respectively. These lobes define open ended channels or chutes and the outer lobes form inner chutes 18 for leading the core gases radially outwardly and the inner lobes define outer chutes 20 for leading the fan air radially inwardly. As noted the outer chutes 20 are in a decreasing diameter from an upstream to the downstream end and the inner chutes 18 are in an increasing diameter in the same direction.

In accordance with this invention, certain inner lobes are extended radially inwardly and axially downstream relative to the unextended lobes. In its preferred embodiment alternate inner lobes 14A were extended at the 60° intervals. As would be understood by one skilled in the art, other intervals, say extending all of the inner lobes, could be employed without departing from the scope of the invention.

Figure 2:
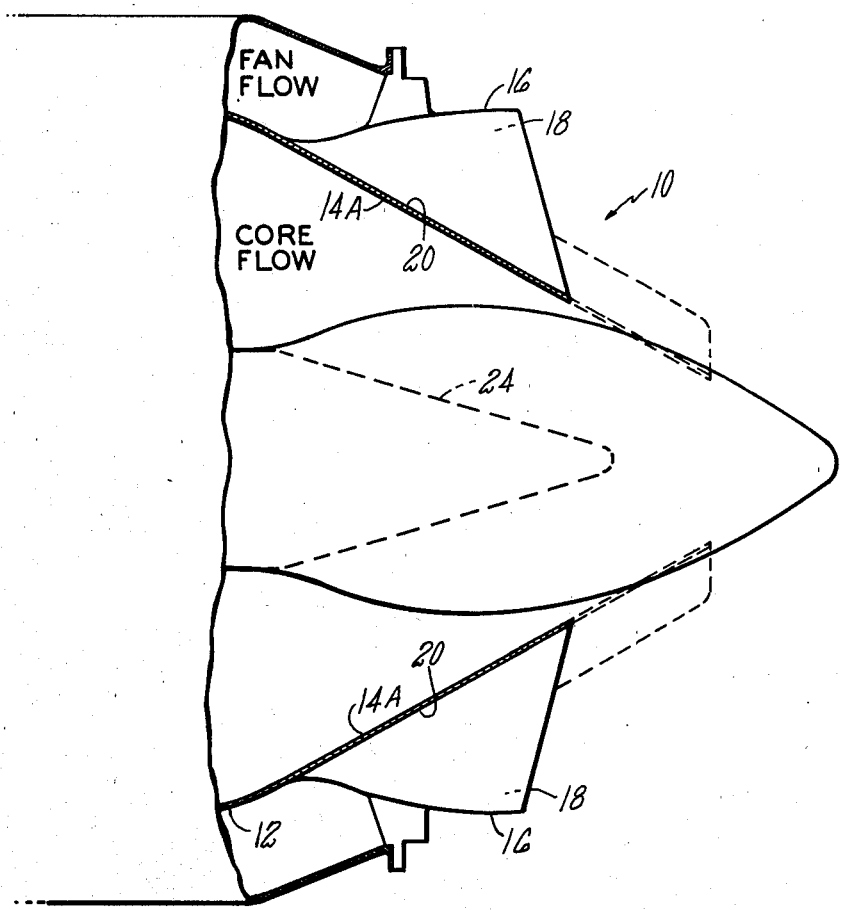
FIG. 2 is a view in schematic showing the improvement over the prior art.

FIG. 2 shows the improvement of the mixer over the prior art lobe mixer. The dash line shows the improvement over the heretofore known mixers. As noted certain inner lobes 14A are extended radially inwardly and axially downstream of the outer lobe. Also, this allows a new configuration of the centerbody illustrated by the dash lines 24. The prior art centerbody was a larger bulbous shaped mass as compared with the generally conical shaped centerbody 24.

It should be understood that the invention is not limited to the particular embodiments shown and described herein, but that various changes and modifications may be made without departing from the spirit and scope of this novel concept as defined by the following claims.

I claim:

1. A lobe mixer for a fan jet engine having coannular streams one of which flows from the fan and the other flows from the core of the engine, said mixer having a generally cylindrically shaped body disposed parallel to said coannular streams and having a sinusoidal portion on the rearward end with respect to the direction of flow of said coannular streams, the sinusoidal portion defining open ended chutes in alternate increasing diameter and decreasing diameter in the axial extending direction relative to the centerline of said cylindrically shaped body, the increasing diameter chutes adapted to direct the core stream and the decreasing diameter chutes adapted to direct the fan stream, both fan stream and core stream mixing at the discharge end of said mixer, at least some of said decreasing diameter chutes extending axially from the increasing diameter chutes and some of said decreasing diameter chutes extend further radially inwardly toward the centerline relative to the other of said decreasing diameter chutes.

2. A lobe mixer as in claim 1 wherein alternate ones of said decreasing diameter chutes extend both axially from the downstream end of and radially inwardly toward the centerline relative to the adjacent decreasing diameter chutes.

3. A lobe mixer as claimed in claim 2 including a conically shaped plug disposed centrally of said sinusoidal portion of said mixer.

* * * * *

UNITED STATES PATENT AND TRADEMARK OFFICE
CERTIFICATE OF CORRECTION

PATENT NO. : 4,401,269

DATED : August 30, 1983

INVENTOR(S) : Donald C. Eiler

It is certified that error appears in the above-identified patent and that said Letters Patent is hereby corrected as shown below:

Column 1, line 11 "4,179,375" should be --4,149,375--.

Signed and Sealed this

Fifteenth Day of November 1983

[SEAL]

Attest:

GERALD J. MOSSINGHOFF

Attesting Officer

Commissioner of Patents and Trademarks